United States Patent
Eickhoff et al.

(10) Patent No.: US 9,269,977 B2
(45) Date of Patent: Feb. 23, 2016

(54) POWER GENERATION CAPACITY INDICATOR

(75) Inventors: Steven J. Eickhoff, Plymouth, MN (US); Chunbo Zhang, Plymouth, MN (US)

(73) Assignee: Honeywell International Inc., Morris Plains, NJ (US)

(*) Notice: Subject to any disclaimer, the term of this patent is extended or adjusted under 35 U.S.C. 154(b) by 1228 days.

(21) Appl. No.: 12/632,975

(22) Filed: Dec. 8, 2009

(65) Prior Publication Data

US 2010/0073015 A1 Mar. 25, 2010

Related U.S. Application Data

(63) Continuation of application No. 11/539,323, filed on Oct. 6, 2006, now Pat. No. 7,713,653.

(51) Int. Cl.
*H01M 10/48* (2006.01)
*H01M 8/06* (2006.01)
*C01B 3/06* (2006.01)
*H01M 8/04* (2006.01)

(52) U.S. Cl.
CPC ............ *H01M 8/065* (2013.01); *C01B 3/065* (2013.01); *H01M 8/04208* (2013.01); *H01M 8/04216* (2013.01); *H01M 8/04447* (2013.01); *H01M 8/04619* (2013.01); *C01B 2203/066* (2013.01); *Y02E 60/362* (2013.01); *Y02E 60/50* (2013.01)

(58) Field of Classification Search
CPC .............................. H01M 8/06; H01M 8/0643
USPC ......... 429/408, 410–427, 443–444, 448–449, 429/535, 99; 423/648.1, 657
See application file for complete search history.

(56) References Cited

U.S. PATENT DOCUMENTS

| 2,935,382 A | 5/1960 | Osborn et al. |
| 3,133,837 A | 5/1964 | Eidensohn |
| 3,931,395 A | 1/1976 | Beckert et al. |
| 4,048,385 A | 9/1977 | Regnaut |
| 4,407,904 A | 10/1983 | Uozumi et al. |
| 4,476,196 A | 10/1984 | Poeppel et al. |
| 4,476,197 A | 10/1984 | Herceg |

(Continued)

FOREIGN PATENT DOCUMENTS

| DE | 19734259 | 2/1999 |
| EP | 1351329 | 10/2003 |

(Continued)

OTHER PUBLICATIONS

Aiello et al., "Production of Hydrogen from Cheical Hydrides Via Hydrolysis with Steam," International Journal of Hydrogen Energy, vol. 24, pp. 1123-1130, 1999.

(Continued)

*Primary Examiner* — Barbara Gilliam
*Assistant Examiner* — Claire L Roe
(74) *Attorney, Agent, or Firm* — Schwegman Lundberg & Woessner, P.A.

(57) ABSTRACT

Improved portable power sources such as batteries, fuel cells, power generators and the like can include structure or apparatus that are adapted to provide an indication of the power capacity remaining within the portable power source. In some cases, these power sources may be configured to accommodate remote communication regarding their remaining power capacity.

14 Claims, 4 Drawing Sheets

(56) References Cited

U.S. PATENT DOCUMENTS

| | | |
|---|---|---|
| 4,596,748 A | 6/1986 | Katz et al. |
| 4,659,559 A | 4/1987 | Struthers |
| 4,826,741 A | 5/1989 | Aldhart et al. |
| 4,857,420 A | 8/1989 | Maricle et al. |
| 4,876,163 A | 10/1989 | Reichner |
| 4,906,536 A | 3/1990 | Simonton |
| 4,910,100 A | 3/1990 | Nakanishi et al. |
| 5,248,125 A | 9/1993 | Fritch et al. |
| 5,298,341 A | 3/1994 | Khandkar et al. |
| 5,372,617 A | 12/1994 | Kerrebrock et al. |
| 5,449,697 A | 9/1995 | Noaki et al. |
| 5,534,363 A | 7/1996 | Sprouse et al. |
| 5,789,100 A | 8/1998 | Burroughs et al. |
| 5,804,329 A | 9/1998 | Amendola |
| 5,836,750 A | 11/1998 | Cabuz |
| 5,849,046 A | 12/1998 | Bailey |
| 5,851,689 A | 12/1998 | Chen |
| 5,861,221 A | 1/1999 | Ledjeff et al. |
| 5,948,558 A | 9/1999 | Amendola |
| 5,974,235 A | 10/1999 | Nunally et al. |
| 6,052,124 A | 4/2000 | Stein et al. |
| 6,054,234 A | 4/2000 | Weiss et al. |
| 6,093,501 A | 7/2000 | Werth |
| 6,127,058 A | 10/2000 | Pratt et al. |
| 6,179,986 B1 | 1/2001 | Swette et al. |
| 6,250,078 B1 | 6/2001 | Amendola et al. |
| 6,268,076 B1 | 7/2001 | Diekmann et al. |
| 6,280,869 B1 | 8/2001 | Chen |
| 6,307,605 B1 | 10/2001 | Bailey |
| 6,326,097 B1 | 12/2001 | Hockaday |
| 6,428,680 B1 | 8/2002 | Kreichauf |
| 6,433,129 B1 | 8/2002 | Amendola et al. |
| 6,434,278 B1 | 8/2002 | Hashimoto |
| 6,468,694 B1 | 10/2002 | Amendola |
| 6,471,850 B2 | 10/2002 | Shiepe et al. |
| 6,483,275 B1 | 11/2002 | Nebrigic et al. |
| 6,488,015 B2 * | 12/2002 | Isobe .................. 123/520 |
| 6,497,973 B1 | 12/2002 | Amendola |
| 6,506,510 B1 | 1/2003 | Sioui et al. |
| 6,524,450 B1 | 2/2003 | Hara |
| 6,524,542 B2 | 2/2003 | Amendola et al. |
| 6,534,033 B1 | 3/2003 | Amendola et al. |
| 6,535,658 B1 | 3/2003 | Mendoza et al. |
| 6,541,149 B1 | 4/2003 | Maynard et al. |
| 6,544,679 B1 | 4/2003 | Petillo et al. |
| 6,586,563 B1 | 7/2003 | Ortega et al. |
| 6,596,236 B2 | 7/2003 | DiMeo, Jr. et al. |
| 6,610,193 B2 | 8/2003 | Schmitman |
| 6,620,542 B2 | 9/2003 | Pan |
| 6,632,554 B2 | 10/2003 | Doshi et al. |
| 6,638,654 B2 | 10/2003 | Jankowksi et al. |
| 6,645,651 B2 | 11/2003 | Hockaday et al. |
| 6,670,444 B2 | 12/2003 | Amendola et al. |
| 6,672,078 B2 | 1/2004 | Ovshinsky et al. |
| 6,683,025 B2 | 1/2004 | Amendola et al. |
| 6,706,909 B1 | 3/2004 | Snover et al. |
| 6,727,012 B2 | 4/2004 | Chen et al. |
| 6,728,422 B1 | 4/2004 | Weiss |
| 6,760,488 B1 | 7/2004 | Moura et al. |
| 6,801,136 B1 | 10/2004 | Goodman et al. |
| 6,804,949 B2 | 10/2004 | Andrews et al. |
| 6,833,207 B2 | 12/2004 | Joos et al. |
| 6,852,436 B2 | 2/2005 | Badding et al. |
| 6,866,806 B2 | 3/2005 | Andrews et al. |
| 6,932,847 B2 | 8/2005 | Amendola et al. |
| 6,939,529 B2 | 9/2005 | Strizki et al. |
| 6,942,941 B2 | 9/2005 | Blunk et al. |
| 6,950,030 B2 | 9/2005 | Kovarik et al. |
| 6,953,009 B2 | 10/2005 | Reinke et al. |
| 6,977,123 B1 | 12/2005 | Burroughs et al. |
| 7,001,681 B2 | 2/2006 | Wood |
| 7,019,105 B2 | 3/2006 | Amendola et al. |
| 7,049,024 B2 | 5/2006 | Leban |
| 7,073,368 B2 | 7/2006 | Wood et al. |
| 7,083,657 B2 | 8/2006 | Mohring et al. |
| 7,105,033 B2 | 9/2006 | Strizki et al. |
| 7,108,777 B2 | 9/2006 | Xu et al. |
| 7,128,997 B2 | 10/2006 | Harding et al. |
| 7,322,205 B2 | 1/2008 | Bourne et al. |
| 7,367,334 B2 | 5/2008 | Faison, Jr. et al. |
| 7,524,342 B2 | 4/2009 | Brinkley, III |
| 7,691,527 B2 | 4/2010 | Petillo et al. |
| 7,713,653 B2 | 5/2010 | Eickhoff et al. |
| 7,883,804 B2 * | 2/2011 | Takei et al. .................. 429/414 |
| 2001/0012494 A1 | 8/2001 | Kreichauf |
| 2001/0028973 A1 | 10/2001 | Ong et al. |
| 2002/0068213 A1 | 6/2002 | Kaiser et al. |
| 2002/0154310 A1 | 10/2002 | DiMeo, Jr. et al. |
| 2002/0177031 A1 | 11/2002 | Doshi et al. |
| 2002/0182459 A1 | 12/2002 | Hockaday et al. |
| 2003/0009942 A1 | 1/2003 | Amendola et al. |
| 2003/0044656 A1 | 3/2003 | Wood |
| 2003/0054215 A1 | 3/2003 | Doshi et al. |
| 2003/0157018 A1 | 8/2003 | Zaluski et al. |
| 2004/0009379 A1 | 1/2004 | Amendola et al. |
| 2004/0011662 A1 | 1/2004 | Xu et al. |
| 2004/0033194 A1 | 2/2004 | Amendola et al. |
| 2004/0035054 A1 | 2/2004 | Mohring et al. |
| 2004/0047801 A1 | 3/2004 | Petillo et al. |
| 2004/0053100 A1 | 3/2004 | Stanley et al. |
| 2004/0120889 A1 | 6/2004 | Shah et al. |
| 2004/0148857 A1 | 8/2004 | Strizki et al. |
| 2004/0161646 A1 | 8/2004 | Rezachek et al. |
| 2004/0191152 A1 | 9/2004 | Amendola et al. |
| 2004/0215407 A1 | 10/2004 | Theielman et al. |
| 2005/0095470 A1 | 5/2005 | Harding et al. |
| 2005/0132640 A1 | 6/2005 | Kelly et al. |
| 2005/0135996 A1 | 6/2005 | Ortega et al. |
| 2005/0142410 A1 | 6/2005 | Higashi et al. |
| 2005/0166812 A1 | 8/2005 | Noll et al. |
| 2005/0181245 A1 | 8/2005 | Bonne et al. |
| 2005/0199546 A1 | 9/2005 | Rusta-Sallehy et al. |
| 2005/0238573 A1 | 10/2005 | Zhang et al. |
| 2005/0260461 A1 | 11/2005 | Wood et al. |
| 2005/0262924 A1 | 12/2005 | Wood et al. |
| 2005/0268555 A1 | 12/2005 | Amendola et al. |
| 2005/0276746 A1 | 12/2005 | Zhang et al. |
| 2006/0014059 A1 | 1/2006 | Wood |
| 2006/0021279 A1 | 2/2006 | Mohring et al. |
| 2006/0040152 A1 | 2/2006 | Wood |
| 2006/0045228 A1 | 3/2006 | Shiao et al. |
| 2006/0102489 A1 | 5/2006 | Kelly |
| 2006/0102491 A1 | 5/2006 | Kelly et al. |
| 2006/0144701 A1 | 7/2006 | Kelly |
| 2006/0210850 A1 | 9/2006 | Abouatallah et al. |
| 2006/0261349 A1 | 11/2006 | Doering et al. |
| 2007/0105008 A1 | 5/2007 | Gu et al. |
| 2007/0217994 A1 | 9/2007 | Amendola et al. |
| 2007/0259227 A1 | 11/2007 | Oishi et al. |
| 2007/0269698 A1 | 11/2007 | Gu |
| 2007/0275291 A1 | 11/2007 | Gu et al. |
| 2007/0277870 A1 | 12/2007 | Wechsler |
| 2007/0287059 A1 | 12/2007 | Eickhoff et al. |

FOREIGN PATENT DOCUMENTS

| | | |
|---|---|---|
| EP | 1496561 | 1/2005 |
| EP | 1372205 | 10/2008 |
| GB | 723180 | 2/1955 |
| GB | 2164446 | 3/1986 |
| JP | 57138782 | 8/1982 |
| JP | 60000066 | 1/1985 |
| JP | 4342439 | 11/1992 |
| JP | 666787 | 3/1994 |
| JP | 06066787 | 3/1994 |
| JP | 9326259 | 12/1997 |
| WO | 0035032 | 6/2000 |
| WO | 0045457 | 8/2000 |
| WO | 0185606 | 11/2001 |
| WO | 03084866 | 10/2003 |
| WO | 2004025750 | 3/2004 |
| WO | 2004035464 | 4/2004 |
| WO | 2004075375 | 9/2004 |
| WO | 2005013403 | 2/2005 |

(56) References Cited

FOREIGN PATENT DOCUMENTS

OTHER PUBLICATIONS

Amendola et al., "A Novel High Power Density Borohydride-Air Cell," Electromechanical Society Proceedings, vol. 98-15, pp. 47-54, Nov. 1, 1998.
Amendola et al., "A Safe Portable Hydrogen Gas Generator Using Aqueous Borohyfride Solution and Ru Catalyst," International Journal of Hydrogen Energy, Vo., 25, No. 10, pp. 969-975, 2000.
Amendola et al., An Ultrasafe Hydrogen Generator: Aqueous, Alkaline Borohydride Solutions and Ru Calalyst, Journal of Power Sources, vol. 85, No. 2, pp. 186-189, 2000.
Medioni et al., "Event Detection and Analysis from Video Streams," IEEE Transactions on Pattern Analysis and Machine Intelligence, vol. 23, No. 8, pp. 873-889, Aug. 2001.
Porikli et al., "Event Detection by Eigenvector Decomposition Using Object and Frame Features," IEEE, 10 pages, 2004.
"U.S. Appl. No. 11/539,323, Final Office Action mailed Oct. 6, 2009", 14 pgs.
"U.S. Appl. No. 11/539,323, Notice of Allowance mailed Dec. 14, 2009", 13 pgs.
"U.S. Appl. No. 11/539,323, Response filed Feb. 6, 2009 to Restriction Requirement mailed Jan. 9, 2009", 5 pgs.
"U.S. Appl. No. 11/539,323, Response filed Jul. 10, 2009 to Non Final Office Action mailed Apr. 10, 2009", 8 pgs.
"U.S. Appl. No. 11/539,323, Response filed Dec. 4, 2009 to Final Office Action mailed Oct. 6, 2009", 6 pgs.
"U.S. Appl. No. 11/539,323, Restriction Requirement mailed Jan. 9, 2009", 8 pgs.
"European Application Serial No. 07843737.3, Office Action mailed May 18, 2009", 2 pgs.
"European Application Serial No. 07843737.3, Office Action mailed Aug. 9, 2010", 3 pgs.
"European Application Serial No. 07843737.3, Office Action mailed Sep. 28, 2011", 5 pgs.
"European Application Serial No. 07843737.3, Office Action mailed Oct. 23, 2009", 6 pgs.
"European Application Serial No. 07843737,3, Response filed Feb. 23, 2010 to Office Action mailed Oct. 23, 2009", 10 pgs.
"European Application Serial No. 07843737.3, Response filed Mar. 9, 2012 to Office Action mailed Sep. 28, 2011", 6 pgs.
"European Application Serial No. 07843737.3, Response filed Dec. 6, 2010 to Office Action mailed Aug. 9, 2010", 8 pgs.
http://www.engadget.com/2010/02/03/horizon-debuts-h-cell . . . , "Horizon Debuts H-Cell 2.0 Hydrogen Fuel Cell System for Ric Cars," 3 pages, printed Feb. 12, 2010.
Horizon Fuel Cell Technologies, "Hobby RC Industry Leaps into the Future with Hydrogen Power," 2 pages, Feb. 3, 2010.

* cited by examiner

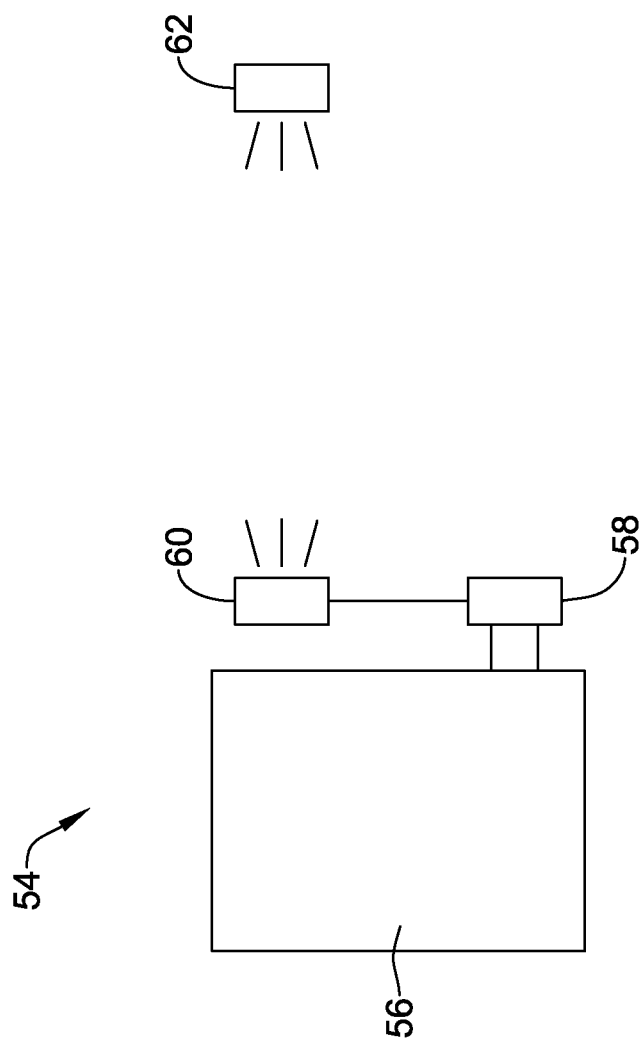

POWER GENERATION CAPACITY INDICATOR

This application is a continuation of U.S. patent application Ser. No. 11/539,323, filed Oct. 6, 2006, and entitled "POWER GENERATION CAPACITY INDICATOR", which is incorporated herein by reference.

TECHNICAL FIELD

The present disclosure pertains generally to power sources and more particularly to portable power sources.

BACKGROUND

Electronic devices have become synonymous with modern life. In many cases, electronic devices are portable, and thus require portable power sources such as batteries, fuel cells and the like. Since no known portable power source lasts forever, it may become necessary, at some point during the life of the electronic device, to replace the portable power source.

Some electronic devices, such as some sensors and/or actuators, can be disposed or otherwise located in remote positions that make power source monitoring and/or replacement difficult. In important or even critical devices, one may be forced to replace the portable power source on a regular schedule, regardless of the remaining capacity of the power sources. While this technique may help ensure an ongoing power supply, the power sources may be replaced sooner than necessary and thus this technique may be viewed as wasteful. In less important devices, one may simply wait and replace the portable power source when the portable power source no longer provides sufficient energy to power the device.

A need remains for improved portable power sources that can provide an indication of their remaining capacity. A need also remains for ways to remotely communicate with portable power sources, and in particular, remotely monitor an indication of the remaining capacity of such power sources.

SUMMARY

The present invention pertains to improved portable power sources, including power sources that are adapted to provide an indication of their remaining capacity. In some instances, the present invention pertains to portable power sources that are configured to provide an indication of their remaining capacity to a remote location, sometimes using an RFID tag.

In one illustrative embodiment, a power generator is provided that has a fuel gas generator including a solid fuel. In some cases, the fuel gas generator may be a hydrogen gas generator, but this is not required. A fuel cell may be in fluid communication with the fuel gas generator. A capacity detection element may be disposed near or within the fuel gas generator.

In some instances, the power generator may further include a water vapor source that may be in fluid communication with the fuel gas generator. In some cases, the fuel gas generator may instead be configured to accept water from the fuel cell instead of a separate water vapor source.

In some instances, the capacity detection element may provide an electrical signal that represents remaining fuel capacity. In some cases, the power generator may also include an indicator that is in electrical communication with the capacity detection element and that provides a visual representation of remaining fuel capacity.

In one illustrative embodiment, the indicator may provide a visual indication or representation of the remaining fuel capacity. If desired, the power generator may include an RF transmitter that is coupled to the capacity detection element in order to communicate an indication of the remaining fuel capacity to a remote location, sometimes in response to an interrogation signal from a remotely located interrogator.

In some instances, the capacity detection element may be a member that is coated with a conductive reactive material. The member may be disposed within the fuel gas generator, sometimes substantially perpendicular to a travel direction of a reaction front in the fuel gas generator. The conductive reactive material may, if desired, be a material that changes resistance upon exposure to water or to reaction products within the fuel gas generator. As the fuel is consumed during use of the power generator, the reaction front may move and expose more of the conductive reactive material to water or to reaction products within the fuel gas generator. This may be detected, and an indication of the remaining fuel capacity may be derived therefrom.

In some cases, the capacity detection element may include two or more indicator elements that are disposed at varying depths within the fuel gas generator. The indicator elements may include materials that change color upon exposure to a reaction front within the fuel gas generator. In some cases, an optical fiber may be disposed, sometimes with one end of the optical fiber at least partially within the fuel gas generator, such that the indicator elements can be optically viewed via the other end of the optical fiber from a position external to the fuel gas generator.

Another example embodiment of the present invention may be found in a hydrogen gas generator that includes a solid fuel, an inlet for water vapor and an outlet for hydrogen gas. A fuel capacity indicator may be disposed in or near the solid fuel. In some instances, the fuel capacity indicator may provide a visual representation of remaining fuel capacity. Alternatively, or in addition, the fuel capacity indicator may, if desired, output an electrical signal that is representative of remaining fuel capacity.

Another example embodiment of the present invention may be found in a portable power source assembly that includes a power source and a power source capacity indicator. The portable power source assembly may include an RF transmitter and/or receiver that is in electrical communication with the power source capacity indicator. In some cases, the RF transmitter and/or receiver may be configured to be remotely activated. If desired, the RF transmitter and/or receiver may be in the form of an RFID tag that can read and transmit a value provided by the power source capacity indicator to a remote location. This may allow the remaining capacity of one or many portable power sources to be remotely monitored.

In some instances, the power source may include a battery. In some cases, the power source may include a fuel cell. In some cases, if desired, the power source may include a power generator that incorporates a fuel gas generator. The fuel gas generator may, in some cases, be a hydrogen gas generator, but this is not required.

The above summary of the present invention is not intended to describe each disclosed embodiment or every implementation of the present invention. The Figures, Detailed Description and Examples which follow more particularly exemplify these embodiments.

BRIEF DESCRIPTION

The invention may be more completely understood in consideration of the following detailed description of various embodiments of the invention in connection with the accompanying drawings, in which:

FIG. 4 is a schematic view of a portion of an illustrative but non-limiting power generator in accordance with the an illustrative embodiment of the present invention.

Figure 1:
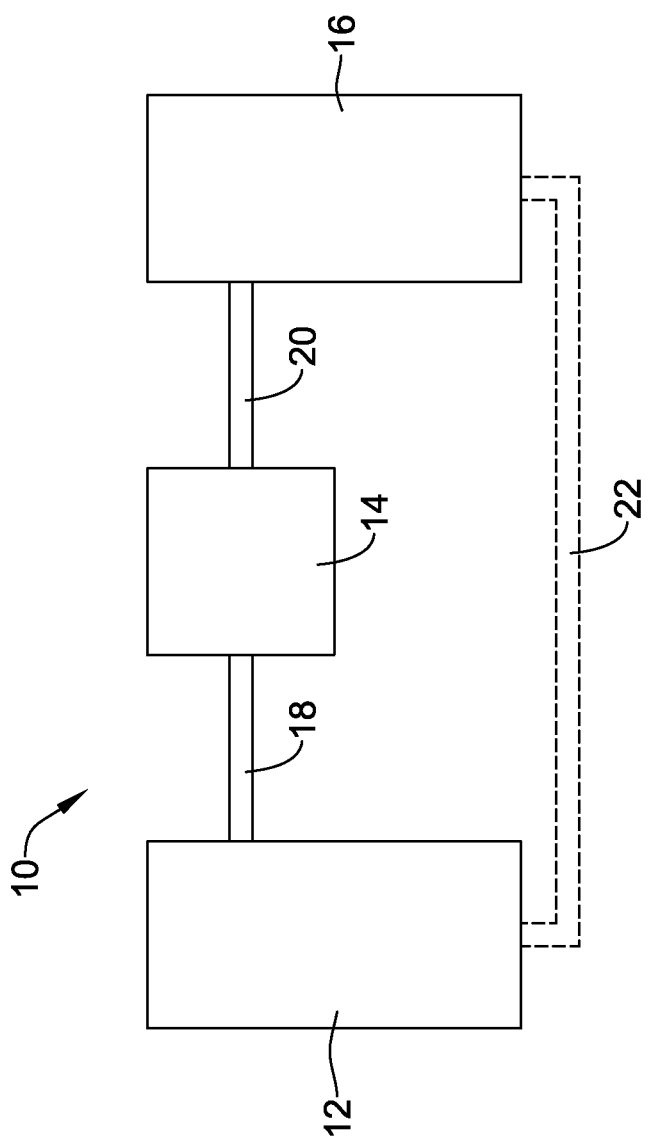
FIG. 1 is a schematic view of an illustrative but non-limiting power generator in accordance with an illustrative embodiment the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

The present invention pertains generally to portable power sources such as batteries, fuel cells, power generators and the like and can include structure or apparatus that are adapted to provide an indication of the power capacity remaining within the portable power source. In some cases, these power sources may be configured to accommodate remote communication regarding their remaining power capacity, sometimes in the form of an RFID tag or the like.

In some instances, the portable power source may include a fuel cell, but this is not required. A fuel cell may create electricity or power by combining, for example, gaseous oxygen and gaseous hydrogen. Oxygen may be obtained directly from the atmosphere, while hydrogen may be provided either in a stored form or may be generated as required. In some cases, as will be discussed hereinafter, hydrogen gas may be generated through a chemical reaction between a reactive metal fuel and an oxidizer. Examples of suitable reactive metal fuels include hydrides such as LiH, LiAlH$_4$, LiBH$_4$, NH$_3$, and MgH$_2$. Examples of suitable oxidizers include hydrogen peroxide, Freon, sulfur hexafluoride and water.

In particular examples, water may be used as an inexpensive and abundant oxidizer and LiAlH$_4$ may be used as the reactive metal fuel. These materials may react to produce molecular hydrogen in accordance with the reaction equation:

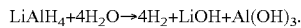

$$LiAlH_4 + 4H_2O \rightarrow 4H_2 + LiOH + Al(OH)_3.$$

As can be seen, each mole of reacted lithium alumina hydride theoretically produces four moles of molecular hydrogen.

FIG. 1 provides a schematic view of an illustrative but non-limiting example of a power generator 10, and more particularly, a power generator that includes a fuel cell. Power generator 10 may include, for example, a water vapor source 12, a hydrogen gas generator 14 and a fuel cell 16. A first conduit 18 may extend from water vapor source 12 to hydrogen gas generator 14 in order to provide a path for water vapor to travel from water vapor source 12 to hydrogen gas generator 14. A second conduit 20 may extend from hydrogen gas generator 14 and to fuel cell 16. In some cases, if desired, an optional conduit 22 may provide a return path from fuel cell 16 to water vapor source 12 so that water produced within fuel cell 16 may be recycled and used within water vapor source 12.

It will be recognized that in some instances, water vapor source 12 may be excluded, as in some cases power generator 10 may be adapted to recycle and use water produced within fuel cell 16, rather than relying on a separate water vapor source. Hydrogen gas generators that rely upon water generated within a fuel cell, rather than a separate water vapor source, are described in greater detail in U.S. patent application Ser. No. 11/270,848, which is incorporated in its entirety by reference herein.

In some cases, one or more pumps (not illustrated) may be employed to help urge water vapor into hydrogen gas generator 14, and/or to urge hydrogen gas into fuel cell 16. In other instances, relative pressure differences or concentration gradients may be relied upon to cause water vapor to move from water vapor source 12 to hydrogen gas generator 14 and/or to cause hydrogen gas to move from hydrogen gas generator 14 to fuel cell 16.

Water vapor source 12 may, in some instances, be or include a chamber that is at least partially filled with solid, liquid or gaseous water. If liquid water is present within water vapor source 12, a membrane (not illustrated) that is permeable to water vapor but not to liquid water may be used to prevent liquid water from reaching hydrogen gas generator 14. In some cases, water vapor source 12 may include other materials in addition to water. For example, if power generator 10 is to be used in a cool or cold environment, the water within water vapor source 12 may include an alcohol such as methanol or ethanol or a non-reactive salt in order to suppress the freezing point.

Hydrogen gas generator 14 may, as noted above, include a substantially non-fluid material that is adapted to react with water to produce molecular hydrogen. This material may be in powdered, granular or pellet form. In many cases, hydrogen gas generator 14 may include a catalyst to facilitate hydrogen gas generation. Examples of suitable catalysts include cobalt, nickel, ruthenium, magnesium and alloys and combinations thereof.

As schematically illustrated in FIG. 1, the elements of power generator 10 (such as water vapor source 12, hydrogen gas generator 14 and fuel cell 16) are shown as distinct elements. In some cases, it will be recognized that one or more of the elements of power generator 10 may be integrally formed on or within a single substrate using MEMS technology, or otherwise combined as desired.

Figure 2:
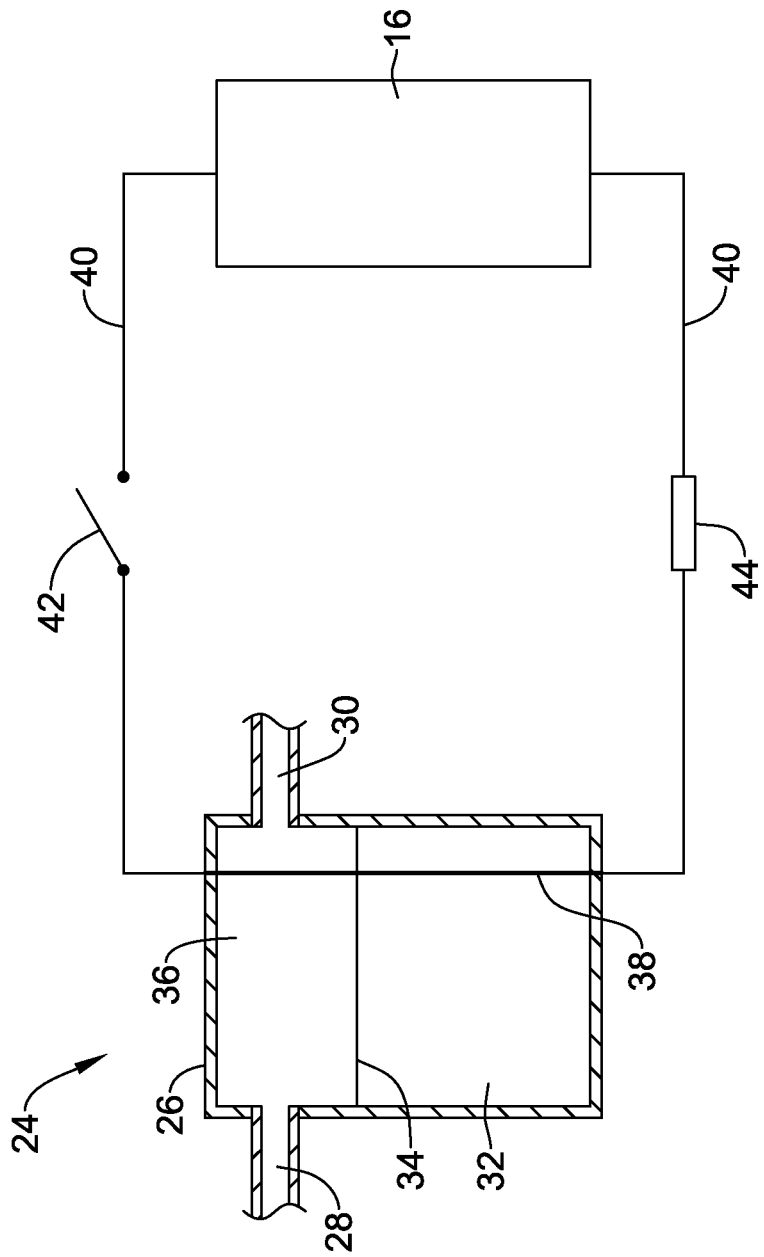
FIG. 2 is a schematic partial cross-sectional view of a portion of an illustrative but non-limiting power generator in accordance with an illustrative embodiment of the present invention.
Figure 3:
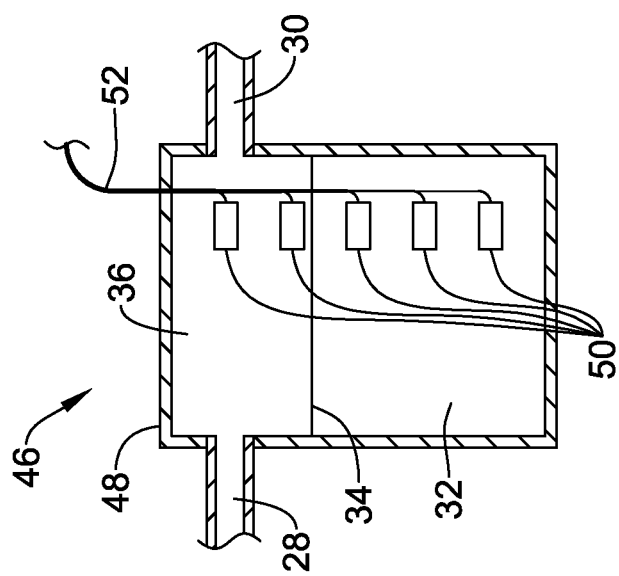
FIG. 3 is a schematic partial cross-sectional view of a portion of an illustrative but non-limiting power generator in accordance with an illustrative embodiment of the present invention.

In some cases, it can be useful to obtain an estimate of the amount of fuel remaining within hydrogen gas generator 14. FIGS. 2, 3 and 4 provide examples of different ways to obtain such information.

FIG. 2 is a schematic view of an illustrative but non-limiting example of a portion of a power generator 24 similar in many respects to power generator 10. Power generator 24 includes a hydrogen gas generator 26 that is shown schematically in cross-section. The illustrative hydrogen gas generator 26 includes an input 28 and an output 30. It will be recognized that input 28 may be in fluid communication with a water vapor source (such as water vapor source 12), while output 30 may be in fluid communication with fuel cell 16, if desired. In some cases, input 28 may provide an inlet for water produced by fuel cell 16.

In the illustrative embodiment, hydrogen gas generator 26 may include a substantially non-fluid material 32. Material 32 may be a reactive metal such as a hydride that may react with an oxidizer such as water to produce hydrogen A reaction front 34 schematically illustrates a boundary between material 32 and an area 36 which, when hydrogen gas generator 26 is operating, will be at least partially filled with water vapor. During use, the material 32 will be consumed, causing the reaction front 34 to move in a downward direction. Reference to a particular direction is arbitrary, and refers merely to the illustrated embodiment. The relative position of reaction front 34 may be used, then, to provide an estimate or measure of how much fuel (material 32) remains within hydrogen gas generator 26.

In the illustrative embodiment shown in FIG. 2, a member 38 is shown disposed within hydrogen gas generator 26 such that it is at least substantially perpendicular to a travel direction (e.g. downward direction) of reaction front 34. The member 38 is configured such that its resistance changes as a result of exposure to either water vapor and/or chemical byproducts of the chemical reaction(s) producing hydrogen within hydrogen gas generator 26.

In some cases, member 38 may be coated with a conductive material that changes its resistance upon the aforementioned exposure. Examples of suitable materials include Group I metals such as lithium, sodium, potassium, rubidium, cesium and francium and Group II metals such as beryllium, magnesium, calcium, strontium, barium and radium. Examples of other materials that undergo changes in conductivity (and hence resistivity) upon exposure to water or other reaction products include other metals such as zinc, conductive polymers such as doped polythiophene and polyanilin. In some instances, carbon nanotubes may undergo conductivity changes.

In some cases, member 38 and the conductive material coated thereon may be coupled to fuel cell 16 via conductive wires or traces 40, a switch 42 and an indicator 44. By closing switch 42, a circuit is completed and current from the fuel cell 16 is able to flow through the conductive material disposed on member 38. Switch 42 may represent a simple mechanical switch, an electrical switch such as a transistor, and electromechanical switch such as a relay, or any other type of switch as desired. In some cases, as will be discussed below, switch 42 may be remotely operated or may represent circuitry adapted to selectively open or close the circuit. Indicator 44 is configured such that it can provide an electrical, visual, audio or other detectable representation of the resistance encountered within the conductive material coated onto member 38, and thus indicator 44 can provide a detectable representation of the remaining fuel capacity within hydrogen gas generator 26.

In the illustrative embodiment of FIG. 2, indicator 44 may be any suitable structure or device that can convert an electrical signal into a visual representation. In some instances, indicator 44 may include a liquid crystal material that may undergo a visible state change when subjected to a particular electric field. If desired, indicator 44 may include a thermally sensitive material disposed over a resistive circuit. When a sufficient current passes through the resistive circuit, the resulting temperature increase causes a certain visible change in the thermally sensitive material. Suitable thermally sensitive materials may include cholesteric liquid crystal materials as well as one or more thermochromic inks used individually or in combination, or any other suitable thermally sensitive material as desired.

In some cases, indicator 44 may include a circuit that is adapted to display a graph such as a bar graph or perhaps light a particular number of indicator lights such as LEDs (light emitting diodes) representing the resistance provided by conductive wire 38 and thereby provide a visual representation of the remaining fuel capacity within hydrogen gas generator 26.

In some cases, indicator 44 may include an electrochromic cell. In some cases, an electrochromic cell may include an ionically conducting electrolyte layer and a layer of electrochromic material sandwiched between a counter electrode and a conductive electrode. An electrochromic cell, by virtue of an oxidation-reduction reaction, may undergo color changes as a result of applied voltage. Thus, the color of the electrochromic cell may provide a visual representation of the current flowing through the circuit and thus provide an indication of the resistance provided by conductive wire 38. Therefore, the color or color change exhibited by the electrochromic cell may be used to provide a visual representation of the amount of fuel (material 32) remaining within hydrogen gas generator 26.

FIG. 3 is a schematic view of an illustrative but non-limiting example of a portion of a power generator 46 similar in many respects to power generator 10. Power generator 46 includes a hydrogen gas generator 48 that is shown schematically in cross-section. The illustrative hydrogen gas generator 48 includes an input 28 and an output 30. It will be recognized that input 28 may be in fluid communication with a water vapor source (such as water vapor source 12 or fuel cell 16) while output 30 may be in fluid communication with fuel cell 16, if desired.

In the illustrative embodiment, hydrogen gas generator 48 may include a non-fluid material 32. A reaction front 34 schematically illustrates a boundary between material 32 and an area 36 which, when hydrogen gas generator 48 is operating, will be at least partially filled with water vapor. During use, the material 32 will be consumed, causing the reaction front 34 to move in a downward direction in the illustrative embodiment. The relative position of reaction front 34 may be used, then, to provide an estimate or measure of how much fuel (material 32) remains within hydrogen gas generator 46.

In the illustrative embodiment of FIG. 3, a series of indicator segments 50 are disposed within hydrogen gas generator 48. In some cases, two or more indicator segments 50 may be disposed at varying depths within material 32. In some instances, it is contemplated that a large number of indicator segments 50 could be dispersed within material 32.

An optical fiber or optical fiber bundle 52 may provide visual access to each of indicator segments 50 from a position exterior to hydrogen gas generator 48. In some cases, each indicator segment 50 includes, is formed of, or is coated with a material that changes color upon exposure to water vapor and/or other reaction products. As the reaction front 34 passes each indicator segment 50, the indicator segment may become exposed to water vapor and/or the reaction products and/or byproducts, and change color. Thus, by viewing the indicator segments 50, sometimes via optical fiber bundle 52, an operator or detector can determine the relative position of reaction front 34 and thus how much fuel (material 32) remains available within hydrogen gas generator 48.

In some cases, it is contemplated that the wall of the hydrogen gas generator 48 adjacent the series of indicator segments 50 may be made transparent or semi-transparent. When so provided, the color or color change of the indicator segments 50 may be viewed from outside of the hydrogen gas generator 48, such as by one or more light detectors, if desired.

Examples of suitable materials for forming indicator segments 50 include silica gel ($SiO_2$) that has been doped with a color change indicator such as cobalt chloride ($CoCl2$) iron salts, copper (II) chloride, and copper sulfate. In some instances, the reaction products and/or byproducts may change the pH within hydrogen gas generator 48. In some cases, pH indicators such as litmus paper (paper soaked in Erythrolitmin or p-Dimethylaminoazobenzenesulfonic acid) may be used as the indicator segments 50.

Examples of other pH indicators include the following dyes:

| Indicator | Color at low pH | pH transition | Color at high pH |
| --- | --- | --- | --- |
| methyl violet | yellow | 0.0 to 1.6 | blue-violet |
| Malachite green | yellow | 0.2 to 1.8 | blue-green |
| Thymol blue (first transition) | red | 1.2 to 2.8 | yellow |
| Methyl yellow | red | 2.9 to 4.0 | yellow |
| bromophenol | yellow | 3.0 to 4.6 | violet |
| Congo red | blue | 3.0 to 5.2 | red |
| Methyl | red | 3.1 to 4.4 | yellow |
| Methyl orange in xylene cyanole solution | purple | 3.2 to 4.2 | green |
| Bromocresol green | yellow | 3.8 to 5.4 | blue |
| Methyl red | red | 4.2 to 6.3 | yellow |
| Litmus (Azolitmin) | red | 4.5 to 8.3 | blue |
| Bromocresol purple | yellow | 5.2 to 6.8 | violet |
| Bromothymol | yellow | 6.0 to 7.6 | blue |
| Phenol red | yellow | 6.6 to 8.0 | red |
| Neutral Red | red | 6.8 to 8 | yellow |
| Thymol blue (second transition) | yellow | 8.0 to 9.6 | blue |
| Phenolphthalein | colorless | 8.2 to 10.0 | pink |
| Thymolphthalein | colorless | 9.4 to 10.6 | blue |
| Alizarin Yellow R | yellow | 10.1 to 12.0 | orange-red |
| Indigo carmine | blue | 11.4 to 13.0 | yellow |

FIG. 4 is a schematic view of an illustrative but non-limiting power system 54. Power system 54 includes a power source 56 that is configured as a portable power source. In some cases, power source 56 may be a battery, fuel cell or any other portable power source. In some instances, power source 56 may be a power generator such as power generator 10, power generator 24 and power generator 46, as previously discussed herein.

The illustrative power system 54 also includes a power source capacity indicator 58 (illustrated schematically). Power source capacity indicator 58 may be configured to output an electrical and/or optical signal that is representative of remaining power capacity.

If power source 56 is a battery or a fuel cell, for example, power source capacity indicator 58 may be switchably connected between the positive and negative terminals of power source 56 and may measure a voltage and/or current therebetween. In some cases, power source capacity indicator 58 may provide a numerical or other value representing remaining power capacity of the power source 56. In some cases, power source capacity indicator 58 may provide a color change or other visual representation as discussed previously with respect to indicator 44.

If power source 56 is a power generator such as power generator 10, 24 and/or 46, then power source capacity indicator 58 may be configured to provide an indication of how much fuel remains within hydrogen generator 12, 26 and/or 48. FIG. 3, for example, provides an example of a power source capacity indicator that yields an electrical output representative of remaining fuel capacity.

In any event, power source capacity indicator 58 may itself provide a visual and/or audio representation of remaining fuel capacity. In some instances, particularly if power source 56 is remotely located, power source capacity indicator 58 may be in electrical communication with an RF (Radio Frequency) ID tag 60.

In some instances, if desired, RF ID tag 60 may communicate with an RF ID tag interrogator 62. In some cases, it is contemplated that RF ID tag 60 includes circuitry that transmits capacity data on a particular time scale. In some cases, RF ID tag 60 is silent until RF ID tag interrogator 62 transmits a request for capacity data. In some instances, it is contemplated that RF ID tag interrogator 62 is adapted to communicate with a number of individual RF ID tags 60, each attached to an individual power source 56. For example, if a facility includes a number of remotely located electrically powered devices such as sensors, actuators or the like, each with an individual power source 56, RF ID tag interrogator 62 may be configured to communicate with each.

In some cases, the RF ID tag interrogator 62 may provide power to the RF ID tag 60. That is the RF ID tag 60 may receive a signal from the RF ID tag interrogator 62 and may use the signal to power the RF ID tag 60. The RF ID tag 60 may then read a measure of the remaining capacity of the power source 56 from the power source capacity indicator 58, and transmit the measure to the RF ID tag interrogator 62. Alternatively, or in addition, the RF ID tag 60 may draw power from the power source 56 itself.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. A fuel gas generator for providing fuel gas to a fuel cell, comprising:
    a housing defining a cavity;
    a solid fuel situated in the cavity of the housing, the solid fuel only filling part of the cavity leaving an open volume within the cavity that is substantially free of solid fuel, wherein a reaction front is initially disposed between the solid fuel and the open volume;
    an input port and an output port, each of the input port and output port being in fluid communication with the open volume;
    a capacity detection mechanism having a first portion disposed at least partially within the solid fuel and a second portion disposed at least partially within the open volume, with the reaction front initially situated between the first portion and the second portion of the capacity detection mechanism, said reaction front moving within the solid fuel towards the first portion during use of the fuel gas generator, the capacity detection mechanism providing a measure related to an amount of solid fuel remaining in the cavity of the housing based on a current position of the reaction front relative to the capacity detection mechanism; and
    wherein the capacity detection mechanism comprises a member coated with a conductive reactive material, the member forming at least part of the second portion of the capacity detection mechanism disposed at least partially within the open volume.

2. The fuel gas generator of claim 1, further comprising a water vapor source in fluid communication with the input port of the fuel gas generator.

3. The fuel gas generator of claim 1, wherein the fuel gas generator is configured to produce a fuel gas that is usable by a downstream fuel cell.

4. The fuel gas generator of claim 3, wherein the fuel gas generator is configured to produce hydrogen gas.

5. The fuel gas generator of claim 1, wherein the capacity detection mechanism provides an electrical signal that is indicative of the measure related to the amount of solid fuel remaining in the cavity of the housing.

6. The fuel gas generator of claim 5, further comprising an indicator in electrical communication with the capacity detection mechanism, the indicator receiving the electrical signal and providing a visual representation of the amount of solid fuel remaining in the cavity of the housing.

7. The fuel gas generator of claim 1, wherein the conductive reactive material changes resistance when exposed to one or more of water, reaction products, and/or reaction byproducts that are present within the solid fuel during use of the fuel gas generator.

8. A fuel gas generator for providing fuel gas to a fuel cell, comprising:
a housing defining a cavity;
a solid fuel situated in the cavity of the housing, the solid fuel only filling part of the cavity leaving an open volume within the cavity that is substantially free of solid fuel, wherein a reaction front is initially disposed between the solid fuel and the open volume;
an input port and an output port, each of the input port and output port being in fluid communication with the open volume;
a capacity detection mechanism having a first portion disposed at least partially within the solid fuel and a second portion disposed at least partially within the open volume, with the reaction front initially situated between the first portion and the second portion of the capacity detection mechanism, said reaction front moving within the solid fuel towards the first portion during use of the fuel gas generator, the capacity detection mechanism providing a measure related to an amount of solid fuel remaining in the cavity of the housing based on a current position of the reaction front relative to the capacity detection mechanism;
wherein the capacity detection mechanism comprises two or more indicator elements initially disposed at varying depths within the solid fuel, and as the reaction front moves within the solid fuel towards the first portion during use of the fuel gas generator, at least one of the two or more indicator elements change color upon exposure to one or more of water, reaction products, and/or reaction byproducts.

9. A fuel gas generator for providing fuel gas to a fuel cell, comprising
a housing defining a cavity;
a solid fuel situated in the cavity of the housing, the solid fuel only filling part of the cavity leaving an open volume within the cavity that is substantially free of solid fuel, wherein a reaction front is initially disposed between the solid fuel and the open volume;
an input port and an output port, each of the input port and output port being in fluid communication with the open volume;
a capacity detection mechanism having a first portion disposed at least partially within the solid fuel and a second portion disposed at least partially within the open volume, with the reaction front initially situated between the first portion and the second portion of the capacity detection mechanism, said reaction front moving within the solid fuel towards the first portion during use of the fuel gas generator, the capacity detection mechanism providing a measure related to an amount of solid fuel remaining in the cavity of the housing based on a current position of the reaction front relative to the capacity detection mechanism;
wherein the capacity detection mechanism comprises two or more indicator elements initially disposed at varying depths within the solid fuel, and as the reaction front moves towards the first portion during use of the fuel gas generator,
an optical fiber that permits viewing of at least some of the two or more indicator elements from a position external to the housing.

10. The fuel gas generator of claim 1, further comprising an RF transmitter coupled to the capacity detection mechanism for transmitting the measure related to the amount of solid fuel remaining in the cavity of the housing.

11. The fuel gas generator of claim 9, wherein the fuel gas generator is configured to generate fuel gas usable by a downstream fuel cell.

12. The fuel gas generator of claim 11, wherein the fuel gas generator is configured to produce hydrogen gas.

13. A method for providing a measure related to an amount of solid fuel remaining in a fuel gas generator, wherein the fuel gas generator includes a housing defining a cavity, a solid fuel situated in the cavity, where the solid fuel only fills part of the cavity leaving an open volume within the cavity that is substantially free of solid fuel, with a reaction front initially situated between the solid fuel and the open volume, wherein the reaction front moves within the solid fuel as the solid fuel is consumed within the fuel gas generator, the method comprising:
providing water or water vapor to the open volume within the cavity of the housing, wherein the water or water vapor reacts with the solid fuel to produce a fuel gas for a downstream fuel cell;
providing a capacity detection mechanism across the reaction front such that at least part of the capacity detection mechanism is initially buried in the solid fuel;
exposing at least part of the capacity detection mechanism that is initially buried in the solid fuel to one or more of water, reaction products, and/or reaction byproducts that are formed within the solid fuel as the solid fuel is consumed by the fuel gas generator
wherein a value of at least one measurable parameter of the capacity detection mechanism changes in response to becoming exposed to the water, water vapor and/or other reaction products within the solid fuel; and
relating that measurable parameter to the amount of solid fuel remaining in the fuel gas generator
wherein the measurable parameter that is related to the amount of solid fuel remaining in the fuel gas generator is at least one of a visual representation of remaining solid fuel by a color change, an electrical signal, an audio signal, and/or other detectable representation of resistance.

14. The method of claim 13, wherein the fuel gas is hydrogen gas.

* * * * *